F. E. KEYES.
MACHINE FOR THE MANUFACTURE OF PAPER SHEETS.
APPLICATION FILED FEB. 5, 1910.
986,993.
Patented Mar. 14, 1911.
6 SHEETS—SHEET 4.
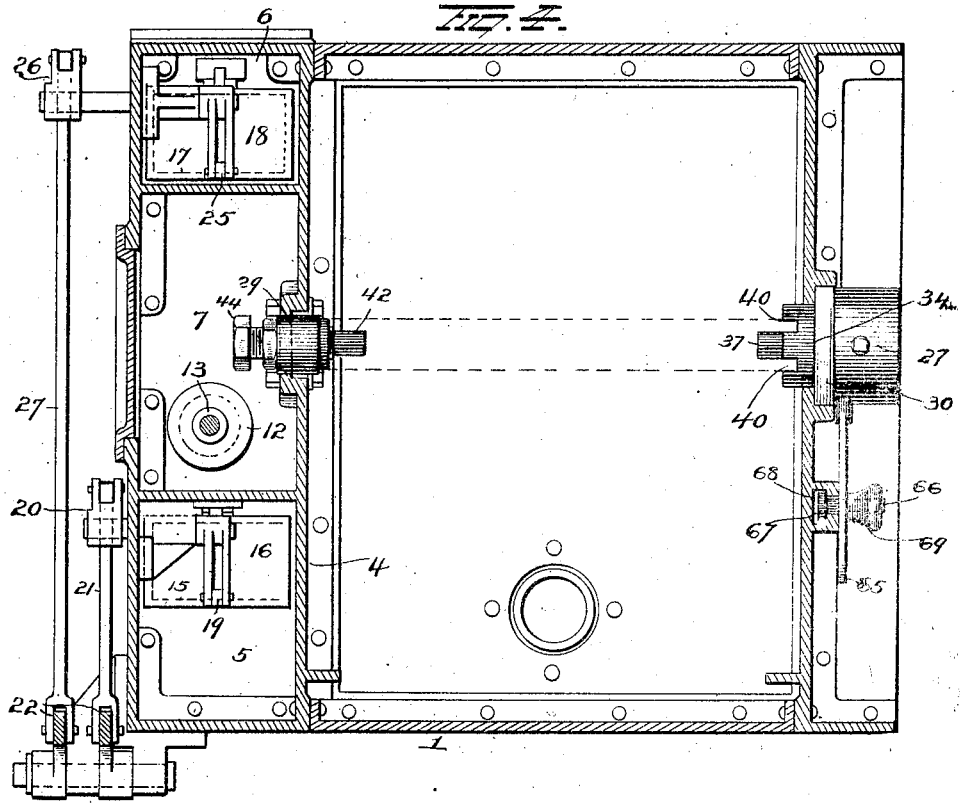
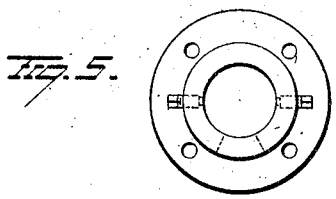
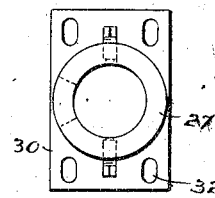
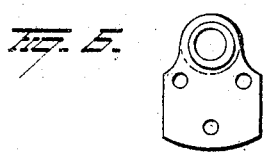
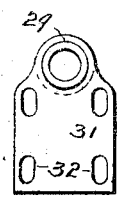
WITNESSES
E. Nottingham
G. F. Downing
INVENTOR
F. E. Keyes
By H. A. Seymour
Attorney F. E. KEYES.
MACHINE FOR THE MANUFACTURE OF PAPER SHEETS.
APPLICATION FILED FEB. 5, 1910.
986,993.
Patented Mar. 14, 1911.
6 SHEETS—SHEET 5.
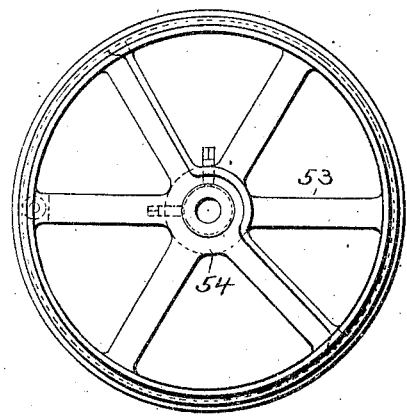
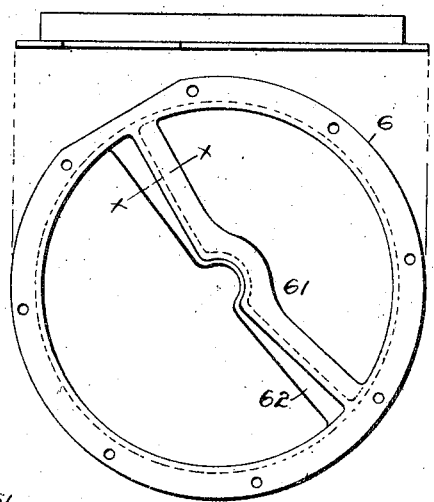
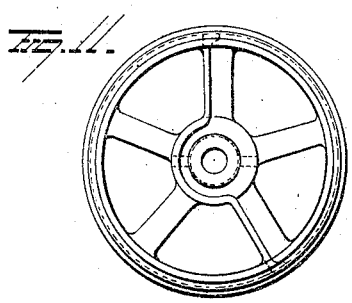
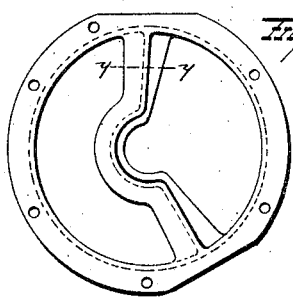
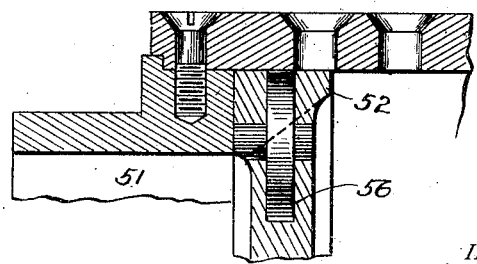
WITNESSES
INVENTOR
F. E. Keyes.
Attorney F. E. KEYES.
MACHINE FOR THE MANUFACTURE OF PAPER SHEETS.
APPLICATION FILED FEB. 5, 1910.
986,993.
Patented Mar. 14, 1911
6 SHEETS—SHEET 6.
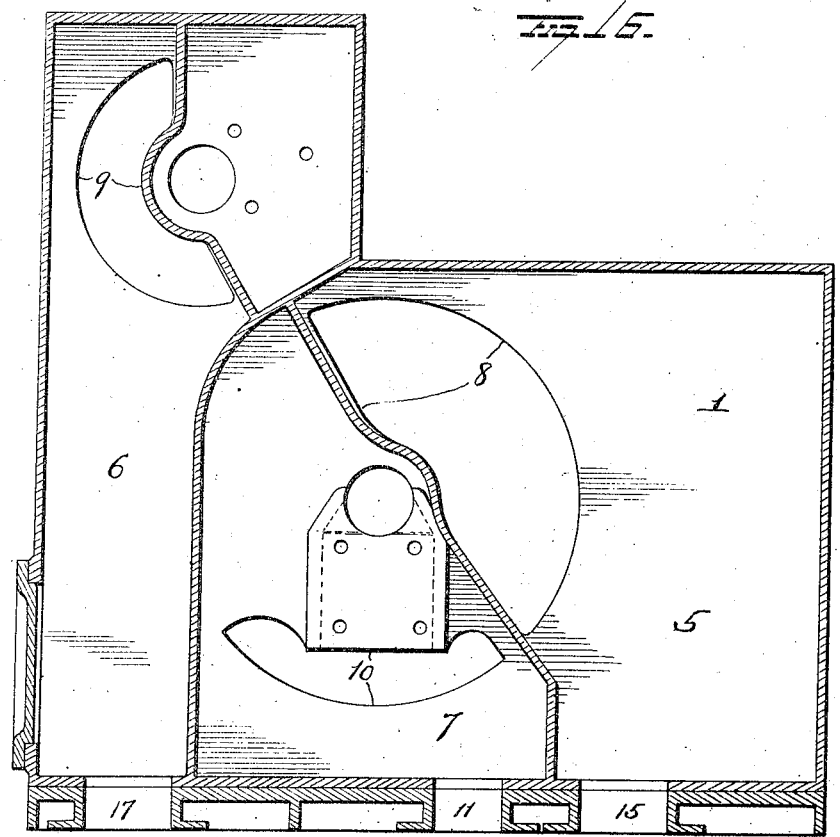

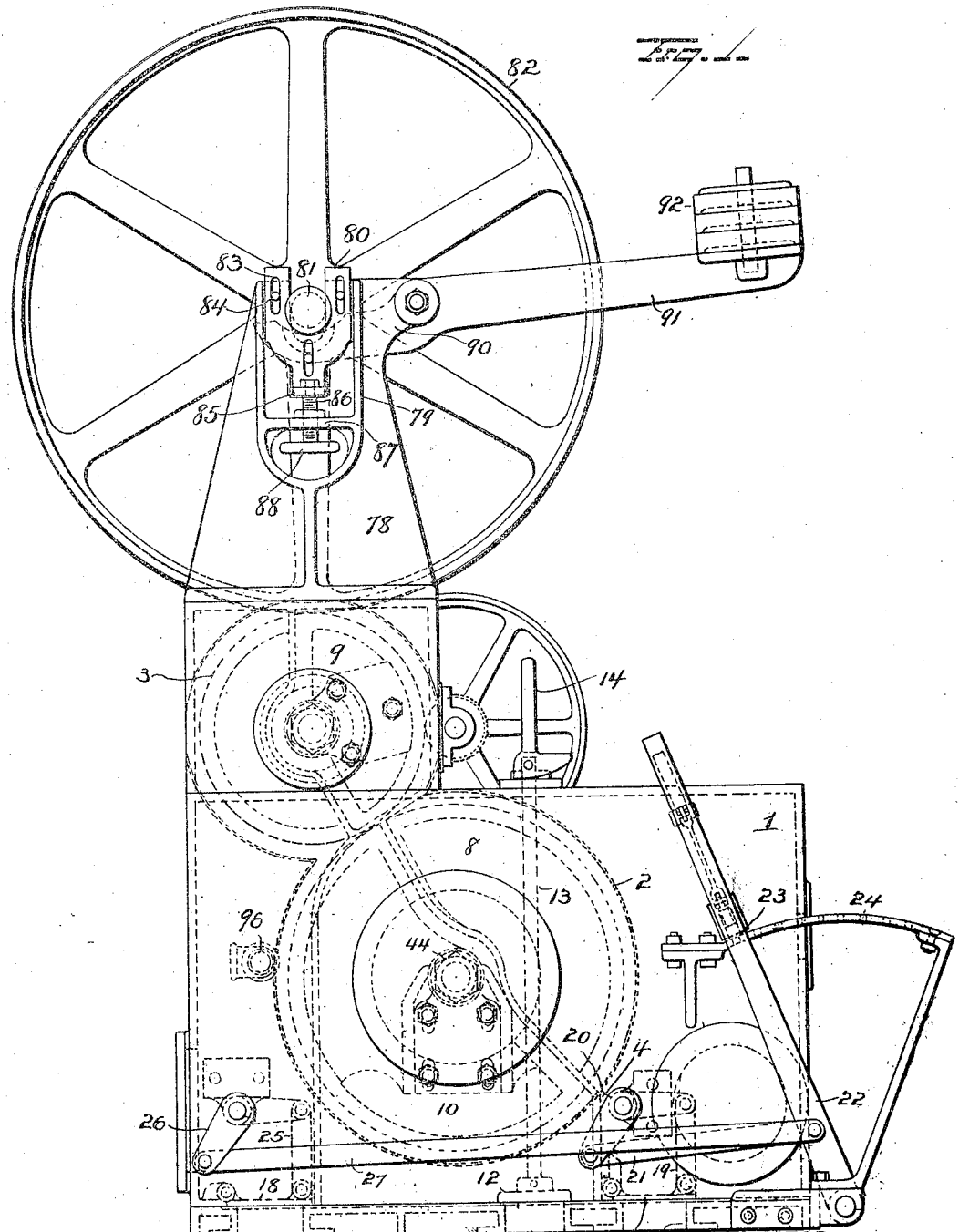

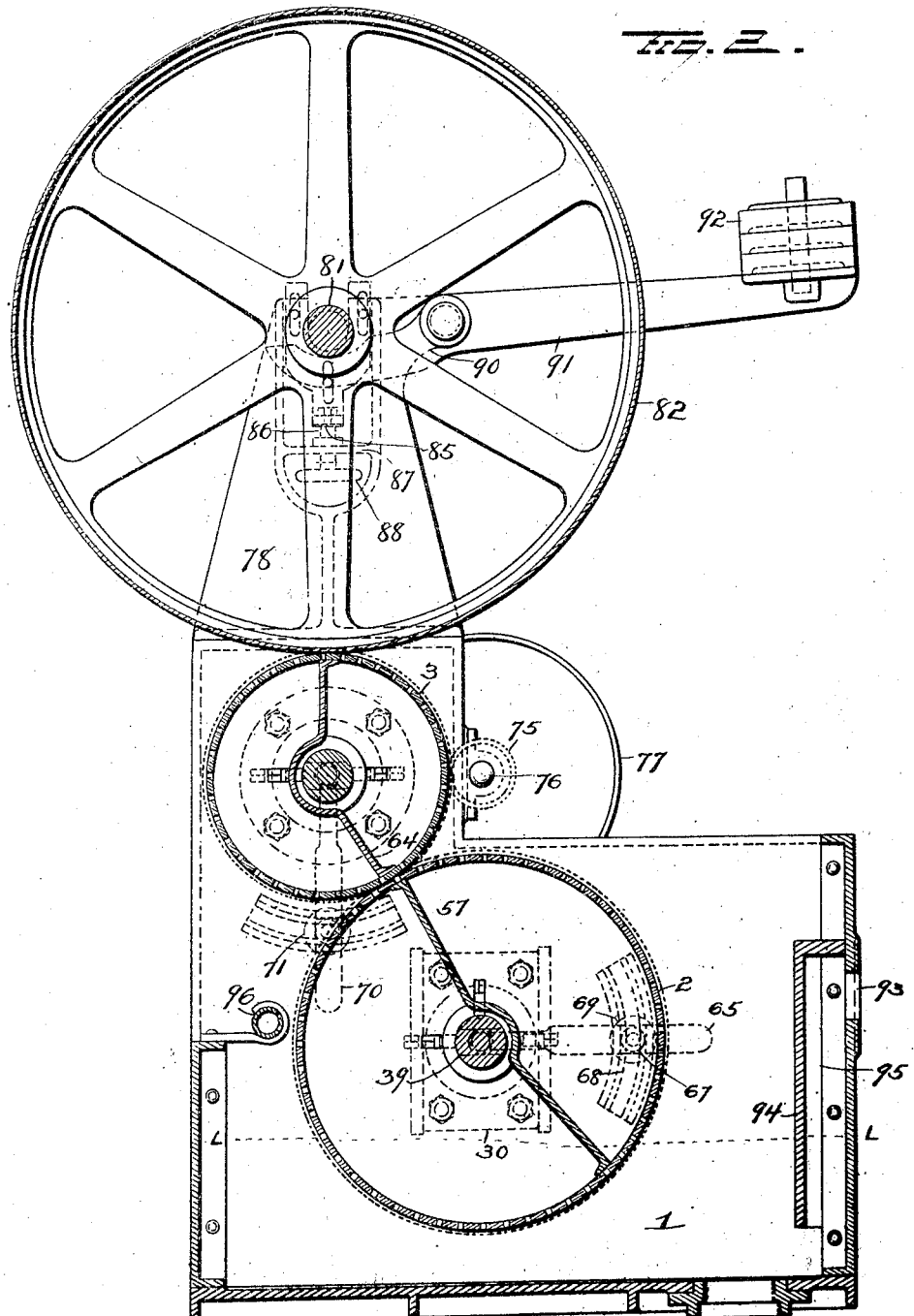

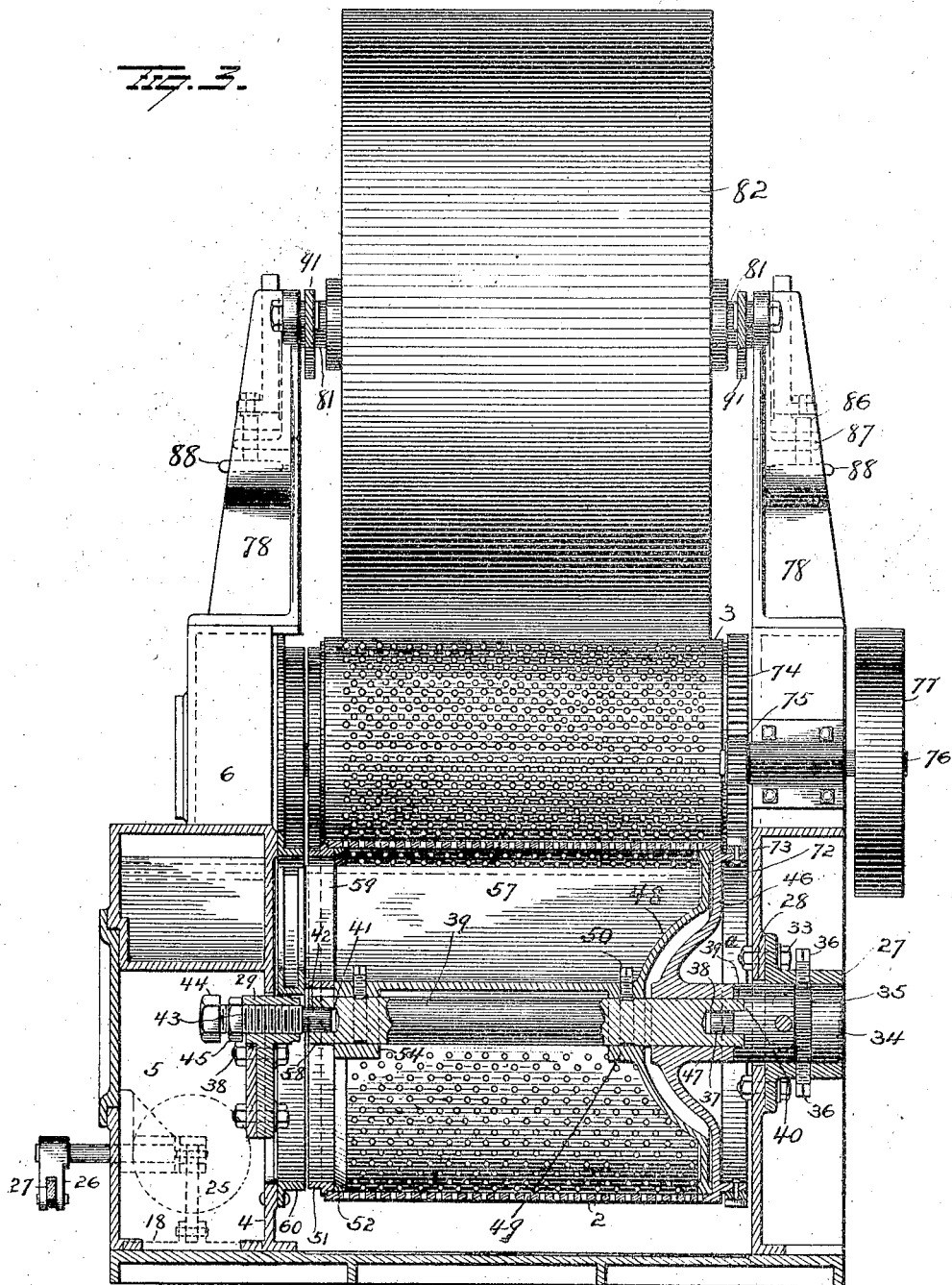

UNITED STATES PATENT OFFICE.

FRANK E. KEYES, OF NEW YORK, N. Y.

MACHINE FOR THE MANUFACTURE OF PAPER SHEETS.

986,993.  Specification of Letters Patent.  Patented Mar. 14, 1911.

Application filed February 5, 1910. Serial No. 542,295.

*To all whom it may concern:*

Be it known that I, FRANK E. KEYES, of New York, in the county of New York and State of New York, have invented certain new and useful Improvements in Machines for the Manufacture of Paper Sheets; and I do hereby declare the following to be a full, clear, and exact description of the invention, such as will enable others skilled in the art to which it appertains to make and use the same.

This invention relates to improvements in machines for the manufacture of paper sheets and more particularly to such as employ reticulated mold and couch shells, to which the pulp is caused to adhere as said shells rotate, by a vacuous condition maintained within a portion of each of said shells.

One object of my present invention is to simplify the construction and reduce the cost of manufacture of a paper sheet forming machine of the character above-mentioned, and to so construct the machine that the product shall be of a superior quality.

A further object is to avoid the use in the mold and couch shells, of numerous partitions such as heretofore employed.

A further object is to provide simple and efficient means for regulating and controlling the exhausting of the air in the mold and couch shells, and the outlet of water from the inclosure containing said shells.

A further object is to provide means for adjusting the extent of peripheral portions of the mold and couch shells to be subjected to the action of vacuous conditions within the same.

With these and other objects in view, the invention consists in certain novel features of construction and combinations of parts as hereinafter set forth and pointed out in the claims.

In the accompanying drawings, Figure 1 is a side elevation of a paper sheet making machine embodying my improvements; Fig. 2 is a vertical sectional view of the same; Fig. 3 is a transverse sectional view of the machine; Fig. 4 is a view in horizontal section; Figs. 5 and 6 are detail views of the bearings for the couch shaft; Figs. 7 and 8 are views of the bearings for the bearings of the parts which support the mold shell; Fig. 9 is a view of the ring on which the mold shell turns at the open end thereof. Fig. 10 is a view of the deckle ring for the mold shell; Fig. 11 is a view of the ring on which the couch shell rotates at the open end thereof; Fig. 12 is a view of the deckle ring for the couch shell; Fig. 13 is a view in section on the line $x-x$ of Fig. 10; Fig. 14 is a sectional view on the line $y-y$ of Fig. 12, and Fig. 15 is an enlarged sectional detail view showing the bearing for the open end of the mold shell. Fig. 16 is a vertical sectional view through chambers 5, 6 and 7.

1 represents a casing in which reticulated mold and couch shells 2 and 3 are located, and this casing is divided by a partition 4 which separates the shells 2 and 3 from a series of chambers 5, 6 and 7. The chambers 5 and 6 are adapted to communicate through suitable openings 8 and 9 in the partition 4, with the mold and couch shells, and an opening 10 in the partition affords means of escape for water to the chamber 7. An outlet 11 for water is provided in the bottom of the chamber 7 and this opening is normally closed by a valve 12. The rod or stem 13 of this valve extends upwardly and passes through the top of the main portion of the casing, where it is connected with a cam lever 14, for operating it. The chamber 5 is provided in its bottom with an opening 15 with which any suitable air exhausting means is connected, and a valve 16 is provided for controlling the air exhaust in the chamber 5 and the mold shell 2. Similarly air exhausting means is connected with an opening 17 in the bottom of the chamber 6, and a valve 18 is provided over this opening for controlling the air exhaust from said chamber 6 and the couch shell with which it communicates. The valve 15 is connected, by means of a link 19 with one arm of a bell-crank 20, the other arm of said bell-crank (which arm is located exteriorly of the casing) being connected through the medium of a rod 21, with an operating lever 22. This operating lever is pivotally supported at its lower end and is provided with a hand operated detent 23 to coöperate with a notched or perforated segment 24 for locking said lever and the valve 16 in any position in which the same may be adjusted and thus the exhaust for the mold shell can be accurately controlled and adjusted. In like manner, the valve 17 is connected by means of a link 25 with a bell-crank 26, one arm of which is connected, through the medium of a rod 27 with an operating lever similar in construction to the lever 22 and adapted to coöperate with the segment 24 for holding the valve 17 at any desired adjustment to control the exhaust for the couch shell.

A bearing sleeve 27 is secured to one side of the casing 1, in line with an opening 28 therein, and an internally threaded sleeve 29 is secured to the partition 4 opposite sleeve 27,—the plates or flanges 30—31 projecting from said sleeve being provided with vertical elongated slots 32 for the passage of the bolts 33, so that said sleeves can be secured at different vertical adjustments and permit the adjustment of the mold shell of cylinder relatively to the couch shell, as will be hereinafter made apparent.

A hub 34 is mounted in the sleeve 27 and provided with an annular groove 35, into which screws 36 project to prevent longitudinal displacement of said hub. At its inner end, the hub 34 is provided, in line with its axis, with a pintle 37 which enters a socket 38 in one end of a shaft 39 passing centrally through the mold shell. The shaft is provided at respective sides of the socket 38, with lugs 39ª to enter grooves 40 in the end of the hub 34 at respective sides of the pintle 37. In this manner, a clutch is formed between the hub 34 and one end of the shaft 39. The opposite end of the shaft 39 is made with a socket 41 for the reception of a pintle 42 at one end of a screw 43. This screw passes through the sleeve 29 and is provided at its free end with an annular head 44, between which and the end of the sleeve 29, a lock nut 45 is provided for securing the screw at the desired longitudinal adjustment.

The reticulated mold shell 2 is provided at one end with a head 46 which closes this end of the shell, and said head being provided centrally with a hub or sleeve 47 mounted loosely on the shaft 39 and bearing at one end against the hub 34. A head or disk 48 is located adjacent to the head 46 and provided at its center with a collar 49 secured by means of set screw 50 to the shaft 39. The peripheral portion of the disk 48 serves as a bearing for the closed end of the mold shell 2. Within the open end of the mold shell, a ring 51 is secured and this ring projects beyond the end of the shell as shown in Figs. 3 and 15. A ring or wheel 52 is located within the open end of the mold shell adjacent to the inner end of the ring 51 and is connected, by means of spokes 53, with a hub or collar 54 secured by set screw 55 to the shaft 39. The ring or wheel 52 thus serves as a bearing for the mold shell at the open end thereof. If desired, a small wheel 56 may be mounted in the wheel 52 so as to be disposed directly under the bearing of the mold shell against the couch shell.

The sleeves or hubs 49 and 54 are connected by a single partition 57 which projects in opposite directions from said sleeves or hubs and bears at its respective edges against the inner face of the mold shell so as to segregate a portion of the interior of the shell (approximately one half) from the remaining portion during the rotation of said shell,—that portion of the shell thus segregated being above the level of the pulp within the casing (as indicated by the line L in Fig. 2) and in constant communication, through the opening 8 with the exhaust chamber 5. A collar 58 is secured to the shaft 39 adjacent to the open end of the shell 2 and is provided with a narrow section 59 which connects said collar with the ring 51 and is in alinement with and constituting a continuation of the partition 57. Adjacent to the ring 51 at the open end of the mold shell, a deckle ring 60 is secured to the partition 4 and is provided with a transverse member 61 in alinement with the portions 57—59, said transverse member having a flange 62 of such width that slight adjustment of the partition can be made without becoming out of line with said transverse member of the deckle ring.

The construction of the couch shell 3 is the same, except as to size, as that of the mold shell, 2, and the construction and mounting of the partition 64 within the couch shell is the same in construction and manner of mounting as in the case of the partition, except that the partition 64 in the couch shell is so disposed that the segregated portion in which the partial vacuum exists is opposite to the corresponding portion within the mold cylinder.

In order to adjust the portion within the mold shell, to regulate the beginning and end of the segregated or vacuous portion of the mold shell 2, a lever 65 is attached to the hub 34 for turning the shaft 39 and the partition secured thereto. This lever is provided between its ends with a hole through which a stem 66 passes, as best shown in Fig. 4. This stem is provided with a head 67 movable in a dove-tail groove or way 68 on the casing. A nut 69 is screwed on the stem 66 and, by engagement with the lever, causes the head 67 to be clamped in the groove or way 68, and thus to hold the lever 65 and the partition in the position to which the same may be adjusted. The partition 64 in the couch roll may be adjusted in a similar manner, the same being provided with a lever 70 and locking means 71 constructed in the same manner as above explained.

The head 46 at the closed end of the mold shell is provided with an annular flange 72 to which a gear wheel or ring 73 is secured and receives motion from a gear wheel or ring 74 secured in the same manner to the head at the closed end of the couch shell. The gear wheel or ring 74 receives motion from a pinion 75 on a shaft 76 and the latter is provided with a pulley 77 to which motion is imparted by a belt from any convenient source of power.

Standards 78 rise from the top of the casing 1 and are made at their upper ends with integral yokes 79 in which bearing brackets 80 are located for the accommodation of the journals 81 of a winding roll 82. Each bearing bracket 80 is provided with a series of elongated slots 83 into which guide pins 84 project. At the lower end of each bracket, a lug 85 is provided and has swiveled thereto, the upper end of a screw 86. Each screw 86 passes through a threaded hole in a flange 87, and at its lower end, it is provided with a hand wheel 88. By means of these devices, the winding roll may be adjusted vertically.

The standards 78 are provided at their upper ends with arms 90, to which levers 91 are pivotally connected between their ends. The short arms of the levers are made hook-shaped to engage under the journals of the winding roll and the long arms of said levers are provided with weights 92 which serve to counterbalance the winding roll and prevent excessive pressure thereof upon the couch shell.

The front wall of the casing 1 is provided with an inlet opening 93 through which pulp and water are fed in any suitable manner. Upon entering the casing, the pulp and water are directed downwardly by a deflector plate 94, between which and the front wall of the casing, a vertical, elongated duct 95 is formed.

When a proper quantity of pulp has been fed into the machine so that its level will be somewhat above the plane of the lower edge of the partition in the mold shell, as indicated by the line L in Fig. 2 the air exhaust valves 16 and 18 will be opened by the operator and the propelling mechanism for the mold and couch shells started. As the mold shell rotates, the pulp will be drawn by suction onto its outer face and will be held thereon by the vacuous condition prevailing in the segregated front portion of the shell, until the film of pulp reaches the couch shell. The upper edge of the pulp film will then pass beyond the influence of the vacuous condition in the shell, but will be at once brought under the influence of the vacuous condition obtaining in the segregated chamber of the couch shell, and the film of pulp will be caused to adhere to the couch shell, by which latter it will be carried up and delivered to the winding roll. The paper may be taken from the winding roll in any suitable manner. The vacuous condition within the mold and couch shells will not only cause the pulp to properly adhere to the same, but the suction created will remove the water from the film of pulp on said shells, and thus water, (when it becomes excessive in the lower portion of the machine) may be run off by opening the valve or gate 12. For the purpose of removing surplus pulp from the mold cylinder behind the vacuum chamber therein and after the pulp film has been transferred to the couch roll, the mold shell will be subjected to a water spray from a perforated pipe 96.

Numerous slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a machine of the character described, the combination with a container and a reticulated shell, of a normally stationary partition within said shell, means for causing a vacuous condition within the shell at one side of said partition, and means for rotating the shell.

2. In a machine of the character described, the combination with a container, a reticulated shell, and means for rotating the latter, of means for segregating a portion of the space within said shell from the remaining portion, and means for establishing a vacuous condition in said segregated portion in the shell.

3. In a machine of the character described, the combination with a container, and a normally stationary shaft, of a reticulated mold shell, means secured to said shaft for rotatively supporting said shell, means for rotating the shell, a partition secured to the shaft within the shell and segregating a portion of the space therein from the remaining portion, means for creating a vacuous condition within said segregated portion in the shell, and means for rotating the shell.

4. In a machine of the character described, the combination with a container, a reticulated shell therein, and means for rotating said shell, of a normally fixed partition within said shell dividing the interior thereof, means for creating a vacuous condition at one side of said partition, and means for adjusting said partition.

5. In a machine of the character described, the combination with a casing adapted to receive pulp, of a shaft therein, means for normally holding said shaft stationary, a reticulated mold shell having a head at one end mounted loosely on said shaft, a ring or wheel secured to the shaft for the other open end of the shell, a partition secured to said shaft and dividing the space within the shell into two chambers, means for creating a vacuous condition in one of said chambers, and means for rotating said shell.

6. In a machine of the character described, the combination with a casing, of sleeves secured in diametrically opposite walls thereof, a hub mounted in one of said sleeves, a screw mounted in the other sleeve, said hub and screw each having a pintle at the inner end, a shaft having sockets to receive said pintles, a clutch connection between said shaft and hub, a reticulated shell revolubly mounted on said shaft, a partition within said shell and secured to the shell, a lever secured to said hub for adjusting the partition and means for securing said lever at any desired adjustment.

7. In a machine of the character described, the combination with a casing, of a horizontal shaft, means in diametrically opposite walls of the casing for supporting said shaft, a reticulated shell having a head at one end revolubly mounted on said shaft, means secured to the shaft and constituting a bearing for the open end of the shell, two collars secured to the shaft, an annular head projecting from one of said collars and constituting a bearing for the closed end of the shell, a partition rigid with said collars and dividing the space within the shell into two chambers, and means for rotating the shell.

8. In a machine of the character described, the combination with a casing, of a normally stationary shaft therein, a reticulated shell revolubly supported by said shaft, a partition secured to said shaft and dividing the space within the shell into two chambers, means for creating a vacuous condition in one of said chambers, a deckle ring secured to the casing in line with one end of the shell, a transverse member extending across said deckle ring in line with said partition and having a width greater than the thickness of said partition, and means for adjusting said partition.

9. In a machine of the character described, the combination with a casing and a normally stationary shaft therein, of a reticulated shell having a head at one end revolubly mounted on said shaft, a partition secured to the shaft within the shell, a head at one end of said partition constituting a bearing for the closed end of the shell, a wheel or ring supported by the shaft and constituting a bearing for the other end of the shell, a ring secured within the open end of the shell and projecting beyond the same, a partition section within said last-mentioned ring and secured to the shaft, and a deckle ring secured to the casing and coöperating with said partition section.

10. In a machine of the character described, the combination with a casing, of a normally stationary shaft therein, a reticulated mold shell having a head at one end revolubly mounted on said shaft, a partition secured to the shaft within the shell, a head at one end of said partition constituting a bearing for the closed end of the shell, a ring or wheel supported by the shaft and constituting a bearing for the open end of the shell, a couch shell coöperating with the mold shell, a roller supported by said ring or wheel in line with the bearing of the mold shell against the couch shell, means for creating vacuous conditions in portions of said shells, and means for rotating the shells.

11. In a machine of the character described, the combination with reticulated mold and couch shells, normally stationary partitions within said shells dividing the space within each into two chambers, means for creating vacuous conditions in one chamber of each shell, an annular flange on each shell, annular gears secured to the flanges of said shells and meshing with each other, a pinion meshing with one of said gears, and means for driving said pinion.

12. In a machine of the character described, the combination with a casing, of a reticulated mold shell therein, a reticulated couch shell coöperating with the mold shell, a winding roll coöperating with the couch shell, normally stationary partitions dividing the mold and couch shells each into two chambers, means for creating vacuous conditions within one chamber of each shell, and means for controlling such vacuous conditions.

13. In a machine of the character described, the combination with a casing, of a reticulated mold shell and a reticulated couch shell, normally stationary partitions dividing the space within said shells, vacuum chambers communicating with the space at one side of the partitions in the respective cylinders, a valve for each vacuum chamber, manually operated means for controlling said valves, a water chamber communicating with the space within the shell occupied by the mold and couch shells, an outlet valve for the water chamber, means for operating said water outlet valve, and means for rotating said shells.

14. In a machine of the character described, the combination with a casing, mold and couch shells therein, means for operating said shells, and standards rising from said casing, of adjustable journal brackets carried by said standards, a winding roll coöperating with the couch roll and having journals mounted in said journal brackets, and pivoted levers weighted at one end and engaging under the journals of the winding reel at the other end.

In testimony whereof, I have signed this specification in the presence of two subscribing witnesses.

FRANK E. KEYES.

Witnesses:
E. D. DONHAM,
L. W. CLARK.